United States Patent
Morell et al.

(10) Patent No.: US 7,127,932 B2
(45) Date of Patent: Oct. 31, 2006

(54) METHOD FOR MONITORING A ROTATIONAL SPEED SENSOR

(75) Inventors: Heinz-Werner Morell, Kaiserslautern (DE); Dietmar Schmid, Villmar (DE)

(73) Assignee: Siemens Aktiengesellschaft, Munich (DE)

( * ) Notice: Subject to any disclaimer, the term of this patent is extended or adjusted under 35 U.S.C. 154(b) by 24 days.

(21) Appl. No.: 10/517,890

(22) PCT Filed: Jun. 2, 2004

(86) PCT No.: PCT/EP2004/050994

§ 371 (c)(1),
(2), (4) Date: Dec. 13, 2004

(87) PCT Pub. No.: WO2005/001382

PCT Pub. Date: Jan. 6, 2005

(65) Prior Publication Data

US 2006/0065038 A1   Mar. 30, 2006

(30) Foreign Application Priority Data

Jun. 30, 2003  (DE)  ................... 103 29 541

(51) Int. Cl.
*G01C 17/38* (2006.01)
(52) U.S. Cl. ........................................ 73/1.77
(58) Field of Classification Search ............... 73/1.77
See application file for complete search history.

(56) References Cited

U.S. PATENT DOCUMENTS 5,226,321 A    7/1993  Varnham et al.
6,564,637 B1   5/2003  Schalk et al.
2002/0178813 A1  12/2002  Babala

FOREIGN PATENT DOCUMENTS

DE    198 45 185 A1    4/2000
WO    WO 01/77620 A1   10/2001

*Primary Examiner*—Robert Raevis
(74) *Attorney, Agent, or Firm*—Cohen, Pontani, Lieberman & Pavane

(57) ABSTRACT

In a method for monitoring a rotation rate sensor with a vibrational gyroscope which has a first input and a first output which form part of a primary control loop which excites the vibrational gyroscope by supplying an excitation signal to the first input at its natural frequency, where the vibrational gyroscope also has a second input and a second output which form part of a secondary control loop, where an output signal can be taken from the second output, said output signal being amplified and subjected to analog/digital conversion and then demodulated into an inphase component and a quadrature component. The components are filtered and are then modulated again and compiled to form a driver signal which is supplied to the second input. A rotation rate signal is derived from the inphase component, the inphase component and the quadrature component have a test signal added to them whose frequency brings about sidebands which are situated in the driver signal outside of the second control loop's passband. The respective test signal which is present in the inphase component and in the quadrature component after passing through the control loop is monitored, and an error message is output if the amplitude is below a prescribed threshold value.

7 Claims, 2 Drawing Sheets

METHOD FOR MONITORING A ROTATIONAL SPEED SENSOR

PRIORITY CLAIM

This is a U.S. national stage of application No. PCT/EP2004/050994, filed on 2 Jun. 2004 which claims priority on the following application: Country: Germany, Application No.: 103 29 541.0, Filed: 30 Jun. 2003.

BACKGROUND OF THE INVENTION

1. Filed of the Invention

The invention relates to a method for monitoring a rotation rate sensor with a vibrational gyroscope which has a first input and a first output which form part of a primary control loop which excites the vibrational gyroscope by supplying an excitation signal to the first input at its natural frequency, where the vibrational gyroscope also has a second input and a second output which form part of a secondary control loop, where an output signal can be taken from the second output, said output signal being amplified and subjected to analog/digital conversion and then demodulated into an inphase component and a quadrature component, where the components are filtered and are then modulated again and compiled to form a driver signal which is supplied to the second input, and where a rotation rate signal is derived from the inphase component.

2. Description of Prior Art

By way of example, U.S. Pat. No. 5,226.321 has disclosed rotation rate sensors in which a vibrational gyroscope is excited in two axes of radial orientation with respect to a main axis, to which end a primary control loop and a secondary control loop with appropriate transducers are provided on the vibrational gyroscope. If such rotation rate sensors are used in vehicles to stabilize the vehicle motion, then risks may arise as a result of failure or incorrect operation. To avoid this, it is necessary to monitor the operation of the rotation rate sensor.

SUMMARY OF THE INVENTION

Such monitoring is advantageously performed in the inventive method by virtue of the inphase component and the quadrature component having a test signal added to them whose frequency brings about sidebands which are situated in the driver signal outside of the second control loop's passband, the respective test signal which is present in the inphase component and in the quadrature component after passing through the control loop being monitored, and an error message being output if the amplitude is below a prescribed threshold value.

The inventive method allows monitoring of the operation of the entire control loop including the vibrational gyroscope during operation without influencing the operation of the rotation rate sensor in any way.

One advantageous development of the inventive method involves measurement signals being taken from the components prior to the addition of the test signal and being synchronously demodulated.

In another development, it is possible to detect as many alterations as possible in the secondary control loop by virtue of the measurement signals from both components respectively being monitored for their amplitude, for the ratio of the amplitudes and/or for their phase. In this case, provision is preferably made for measurement signals to be derived before and after the components are filtered.

Since the sidebands resulting from the modulation and hence also the modulation signal and the measurement signals have extremely small amplitudes, the noise may be suppressed by providing for the synchronously demodulated measurement signals to be integrated over a prescribed time and for the value of the integral to be compared with the prescribed threshold value. Alternatively, the method may also be in a form such that the synchronously demodulated measurement signals are integrated and that the time before the integrated measurements signals reach a prescribed threshold value is measured.

In the case of the known vibrational gyroscopes, it has been found to be beneficial if the modulation signal has a frequency of 200 Hz.

DETAILED DESCRIPTION OF THE PREFERRED EMBODIMENTS

Although the exemplary embodiment and parts thereof are shown as block diagrams, this does not mean that the inventive arrangement is limited to being implemented using individual circuits corresponding to the blocks. Rather, the inventive arrangement can be implemented particularly advantageously using large-scale integrated circuits. In this case, microprocessors may be used which, with suitable programming, perform the processing steps shown in the block diagrams.

Figure 1:
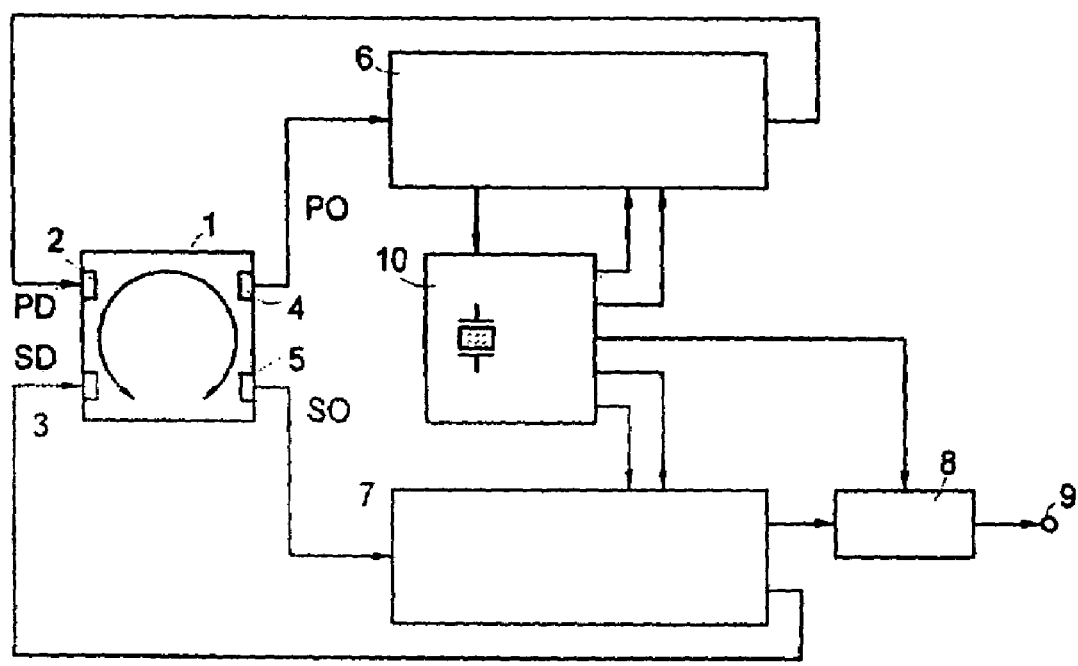
FIG. 1 is a block diagram of a rotation rate sensor.

FIG. 1 shows a block diagram of an arrangement with a vibrational gyroscope 1 having two inputs 2, 3 for a primary excitation signal PD and a secondary excitation signal SD. The excitation is produced by suitable transducers, for example electromagnetic transducers. The vibrational gyroscope also has two outputs 4, 5 for a primary output signal PO and a secondary output signal SO. These signals forward the respective vibration to physically offset points on the gyroscope. Such gyroscopes are known from EP 0 307 321 A1, for example, and are based on the effect of the Coriolis force.

The vibrational gyroscope 1 represents a high quality filter, with the section between the input 2 and the output 4 being part of a primary control loop 6 and the section between the input 3 and the output 5 being part of a secondary control loop 7. The primary control loop 6 is used to excite oscillations at the resonant frequency of the vibrational gyroscope, for example 14 kHz. In this case, the excitation is produced in an axis of the vibrational gyroscope with respect to when the direction of oscillation used for the secondary control loop is offset through 90°. In the secondary control loop 7, the signal SO is split into an inphase component and a quadrature component, one of which is supplied via a filter 8 to an output 9 from which a signal which is proportional to the rotation rate can be picked off.

In both control loops 6, 7, a fundamental part of the signal processing is performed digitally. The clock signals required for the signal processing are produced in a crystal-controlled digital frequency synthesizer 10 whose clock frequency is 14.5 MHz in the example shown. An explanation of the primary control loop is not given, since this is not necessary in order to understand the exemplary embodiment.

Figure 2:
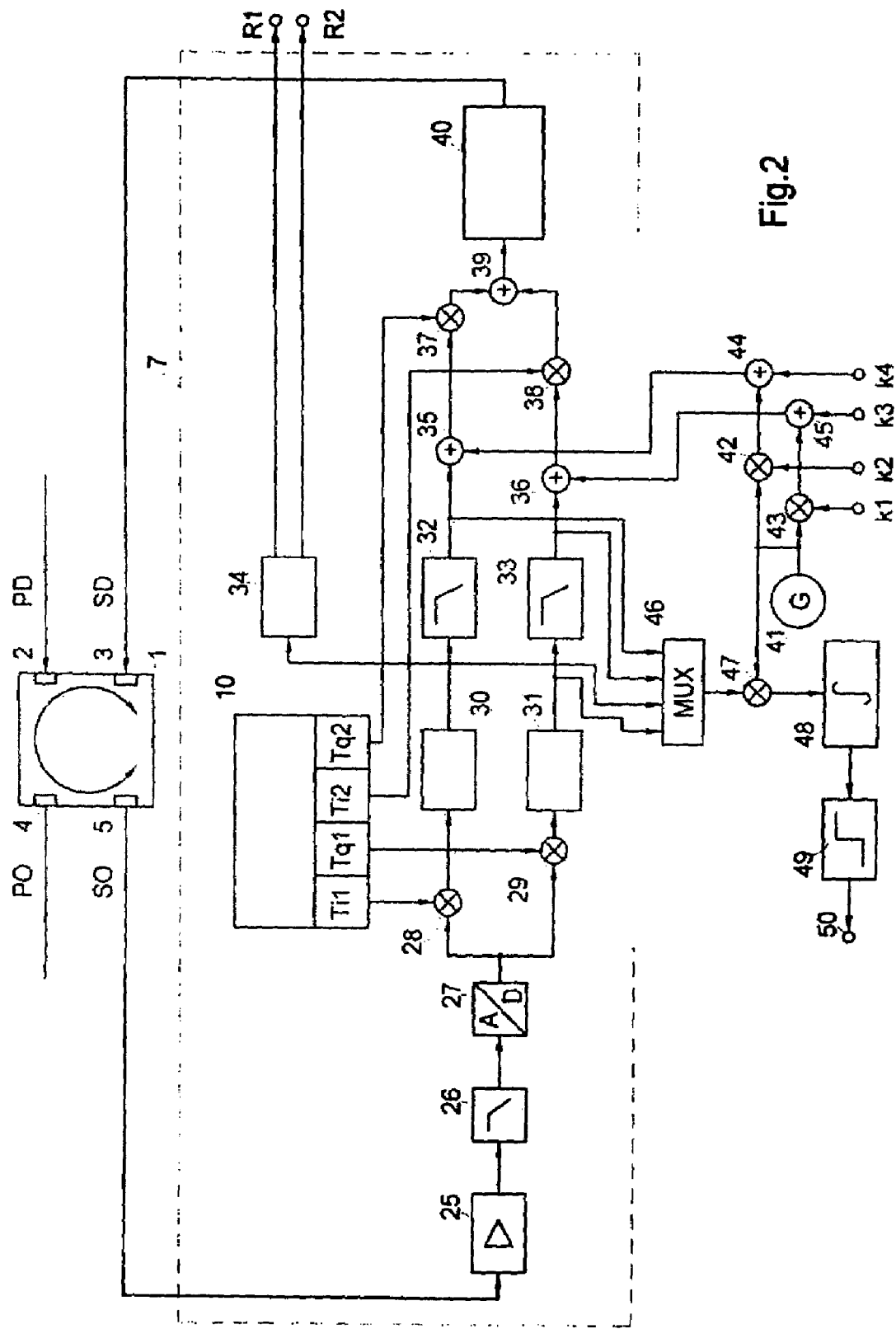
FIG. 2 is a more detailed illustration of a secondary control loop in the rotation rate sensor.

The secondary control loop 7 is shown as a block diagram in FIG. 2 and contains an amplifier 25, an antialiasing filter 26 and an analog/digital converter 27. Using multipliers 28, 29 to which the amplified and digitized signal SO and carrier Ti1 and Tq1 are supplied, splitting is performed to produce an inphase component and a quadrature component.

The two components then respectively pass through a (sinx/x) filter 30, 31 and a low-pass filter 32, 33. A conditioning circuit 34 is used to derive from the filtered real part two signals R1 and R2 which represent the rotation rate which is to be measured with the rotation rate sensor. The signals R1 and R2 differ in that the signal R2 does not adopt the entire amplitude range of between 0V and +5V for example, which is possible with the circuitry used. To output an error message, the signal R2 is changed to zero, which the connected system identifies as an error message.

The low pass filters 32, 33 have a respective adder 35, 36 connected downstream of them. Next, multipliers 37, 38 are used to remodulate the two components Si and Sq with carriers Ti2 and Tq2. An addition at 39 produces a 14-kHz oscillation again, which is converted in an output deliver 40 into a current which is suitable for exciting the vibrational gyroscope 1.

To carry out the inventive method, a modulation signal 200 Hz is produced in a generator 41. Two multipliers 42, 43 multiply this signal by constants k1 and k2, which are variable and are loaded from a memory upon turning on, as a result of which the amplitudes of the test signal for the two components can be set independently of one another. Subsequent adders 44, 45 add variable bias voltages k3 and k4. The test signal's components derived in this manner are added to the inphase component and to the quadrature component in the adders 35 and 36. The subsequent multipliers 37, 38 and the adder 39 then modulate the carrier signal with the recompiled demodulated output signal and additionally with the modulation signal.

The components obtained from the output 5 of the vibrational gyroscope after amplification, antialias filtering 26, analog/digital conversion and demodulation at 28, 39 are respectively tapped off upstream of the filters 32, 33 and downstream of the filters 32, 33 and are supplied as measurement signals to a multiplexer 46 whose output is connected to a multiplier 47 which serves as a synchronous demodulator. The latter's output signal is integrated at 48 over a relatively large number of periods and is supplied to a threshold value circuit 49. The presence of the test signals is established by virtue of the respective integral exceeding a prescribed threshold value within a prescribed time. If this is not the case, an alarm signal is output at 50. A phase error in at least one of the test signals is likewise established by virtue of the synchronous demodulation.

What is claimed is:

1. A method for monitoring a rotation rate sensor with a vibrational gyroscope, wherein said vibration gyroscope includes a first input and a first output connected to a primary control loop and a second input and second output connected to a secondary control loop, said method comprising the steps of:

supplying, from the primary control loop, an excitation signal to the first input at a natural frequency of the vibrational gyroscope;

amplifying an output signal at the second output, subjecting the output signal to analog/digital conversion, and demodulating the converted output signal into an inphase component and a quadrature component;

filtering the inphase and quadrature components, adding a test signal to each of the inphase and quadrature components, modulating the inphase and quadrature components including the test signal after the inphase and quadrature components including the test signal have passed through the secondary control loop, and compiling the filtered and modulated components to form a driver signal that is coupled to the second input, the test signals comprise a frequency causing side bands to be included in the driver signal, the side bands being outside of a passband of the secondary control loop;

deriving a rotation rate signal from the inphase component;

monitoring at least one monitored signal from each of the inphase component and the quadrature component that are passed through the secondary control loop for the presence of the test signals; and generating an error message if the amplitude of a signal derived from one of the at least one monitored signal is below a predetermined value.

2. The method of claim 1, wherein said step of monitoring comprises taking measurement signals from the inphase and quadrature components prior to adding test signals and synchronously demodulating the measurement signals.

3. The method of claim 2, wherein said step of monitoring comprises monitoring the measurement signals from the inphase and quadrature components for at least one of amplitude, ratio of amplitudes, and phase.

4. The method of claim 2, wherein said step of taking measurement signals comprises taking measurement signals of the inphase and quadrature components both before and after the step of filtering.

5. The method of claim 2, further comprising integrating each of the synchronously demodulated measurement signals over a time period and comparing a value of the integration with a threshold value.

6. The method of claim 2, further comprising integrating each of the synchronously demodulated measurement signals, and measuring the elapsed time for the integrated value to reach a threshold value.

7. The method of claim 1, wherein said step of modulating comprises using a modulation signal with a frequency of approximately 200 Hz.

* * * * *